United States Patent [19]
Tsuchimoto et al.

[11] Patent Number: 5,785,732
[45] Date of Patent: Jul. 28, 1998

[54] PROCESS AND APPARATUS FOR RECOVERING NA FROM SPENT NAS CELLS

[75] Inventors: Tomonori Tsuchimoto, Hashima-Gun; Katsuichi Iwata, Ichinomiya; Yoshihiko Kurashima, Nagoya, all of Japan

[73] Assignee: NGK Insulators, Ltd., Japan

[21] Appl. No.: 710,549

[22] Filed: Sep. 19, 1996

[30] Foreign Application Priority Data

Oct. 3, 1995 [JP] Japan .................................. 7-255922
Feb. 23, 1996 [JP] Japan .................................. 8-036269
Sep. 17, 1996 [JP] Japan .................................. 8-244882

[51] Int. Cl.$^6$ .......................... C22B 26/10; H01M 10/54
[52] U.S. Cl. .......................... 75/375; 75/408; 75/589; 75/592; 266/94; 266/205; 429/49
[58] Field of Search .......................... 75/408, 589, 592, 75/375; 429/49; 266/94, 205

[56] References Cited

U.S. PATENT DOCUMENTS 5,587,252  12/1996  Tsuchimoto et al. .................. 429/49

FOREIGN PATENT DOCUMENTS 7-85898  3/1995  Japan .

*Primary Examiner*—Melvyn Andrews
*Attorney, Agent, or Firm*—Parkhurst & Wendel, L.L.P

[57] ABSTRACT

A process for recovering Na from a spent NaS cell, includes the steps of forming an opening in a spent NaS cell, flowing down molten Na from an interior of the NaS cell through the opening in a heating oil vessel, passing the molten Na through a filter placed in the heating oil vessel to remove metallic powder, collecting the molten Na in a bottom portion of the heating oil vessel by utilizing a difference in specific gravity between the molten Na and an oil, and taking out the Na from an outer side of the filter.

12 Claims, 5 Drawing Sheets

FIG_3
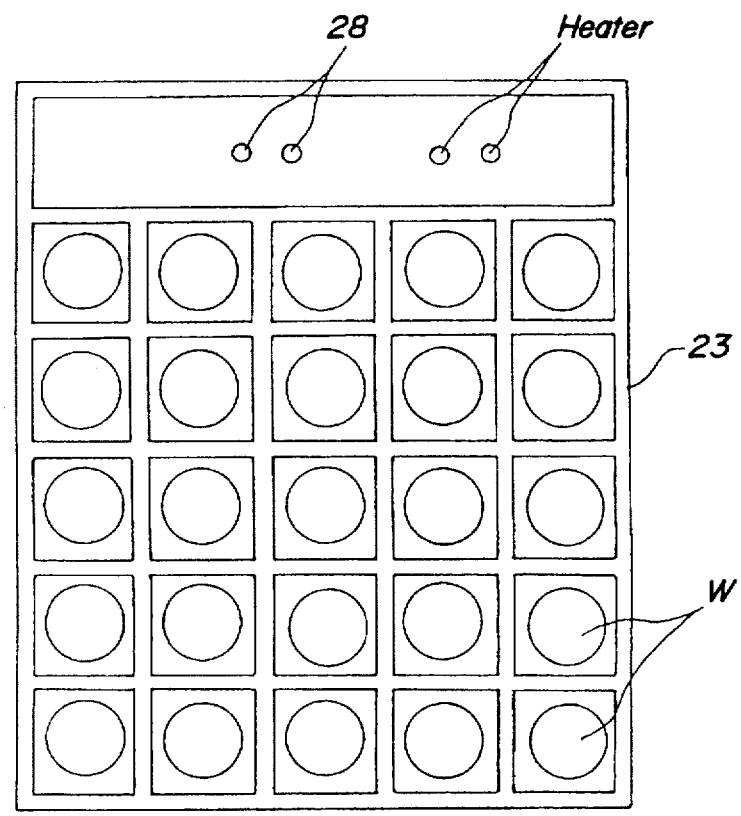
FIG_4
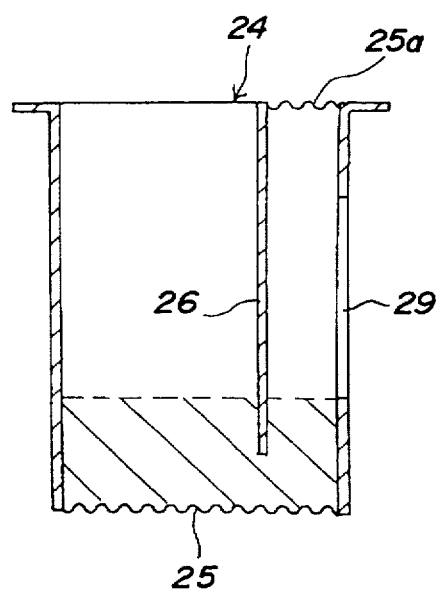

PROCESS AND APPARATUS FOR RECOVERING NA FROM SPENT NAS CELLS

BACKGROUND OF THE INVENTION

(1) Field of the Invention

The present invention relates to a process and an apparatus for recovering Na from a spent NaS cell.

(2) Related Art Statement

The NaS cell is a high temperature cell in which Na and S are sealingly charged inside and outside of a cylinder made of a solid electrolyte β-alumina as a negative pole-activating material and a positive pole-activating material, respectively. Such NaS cells have been developed as cells for storing a large amount of electric power and cells for electric vehicle. Since the useful life of the NaS cell is presumed to be about 10 years, it is expected that a large number of spent NaS cells will appear in the future. The present inventors have been developing a technique for disposing of the NaS cells, and proposed in Japanese patent application Laid-open No. 7-85,898 a process for forming an opening in a spent NaS cell, flowing down molten Na from the spent NaS cell through said opening inside a heating oil vessel filled with heated paraffine, and recovering the molten Na from a bottom portion of the heating oil vessel.

However, their succeeding research revealed that since Na recovered by the process described in Japanese patent application Laid-open No. 7-85,898 contains metallic powder, the recovered Na cannot be used again as a negative pole-activating material for new NaS cells. The metallic powder is produced when an aluminum outer cylinder or a stainless cap is cut to form an opening in the NaS cell, and this metallic powder falls in the interior of the NaS cell and flows down in the heating oil vessel together with the molten Na.

The present invention is to solve the above conventional problem, and has been accomplished to provide a process and an apparatus for readily recovering Na not mixed with metallic powder from a spent NaS cell.

The Na recovering process according to the present invention, which has been accomplished to solve the above-mentioned problem, comprises the steps of forming an opening in a spent NaS cell, flowing down molten Na from an interior of the NaS cell through said opening in a heating oil vessel, passing said molten Na through a filter placed in said heating oil vessel to remove metallic powder, collecting said molten Na in a bottom portion of the heating oil vessel by utilizing a difference in specific gravity between the molten Na and an oil, and taking out the Na from an outer side of the filter. According to the process of this invention, a level of a surface of the molten Na is always kept above a molten Na take-out opening by detecting said level by means of a sensor, and said molten Na is transferred to a falling tank arranged under the surface level of the molten Na by vacuum suction or a head between the surface level of the molten Na in the heating oil vessel and that in the falling tank. Further, it is preferable that levels of the Na and oil in the falling tank are observed by a composite sensor including a rod-shaped molten Na surface level sensor utilizing a conductivity of the molten Na and a rod-shaped oil surface level sensor utilizing a capacitance.

The apparatus for recovering a molten Na from a spent NaS cell according to the present invention, comprises a heating oil vessel in which a spent NaS cell having an opening preliminarily formed is to be set, and a filter placed in the heating oil vessel, wherein a molten Na take-out opening is provided in the heating oil vessel at a location above a bottom face of the heating oil vessel and under a level of an interface between the molten Na and an oil in the heating oil vessel. Furthermore, the molten Na take-out opening is extended downwardly in a side wall of the heating oil vessel as a location of the molten Na take-out opening goes outwardly. It is preferable that molten paraffine oil is charged in the heating oil vessel, and molten Na is separately precipitated in the bottom portion of the heating oil vessel by utilizing a difference in specific gravity between the molten paraffine (0.9) and the molten Na (0.99).

These and other objects, features and advantages of the invention will be appreciated upon reading of the following description when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein:

FIG. 3 is a plane view of a spent NaS cell assembly of the embodiment in FIG. 2;

FIG. 4 is a filter casing;

DETAILED DESCRIPTION OF THE INVENTION

In the following, preferred embodiments of the present invention will be illustrated.

Figure 1:
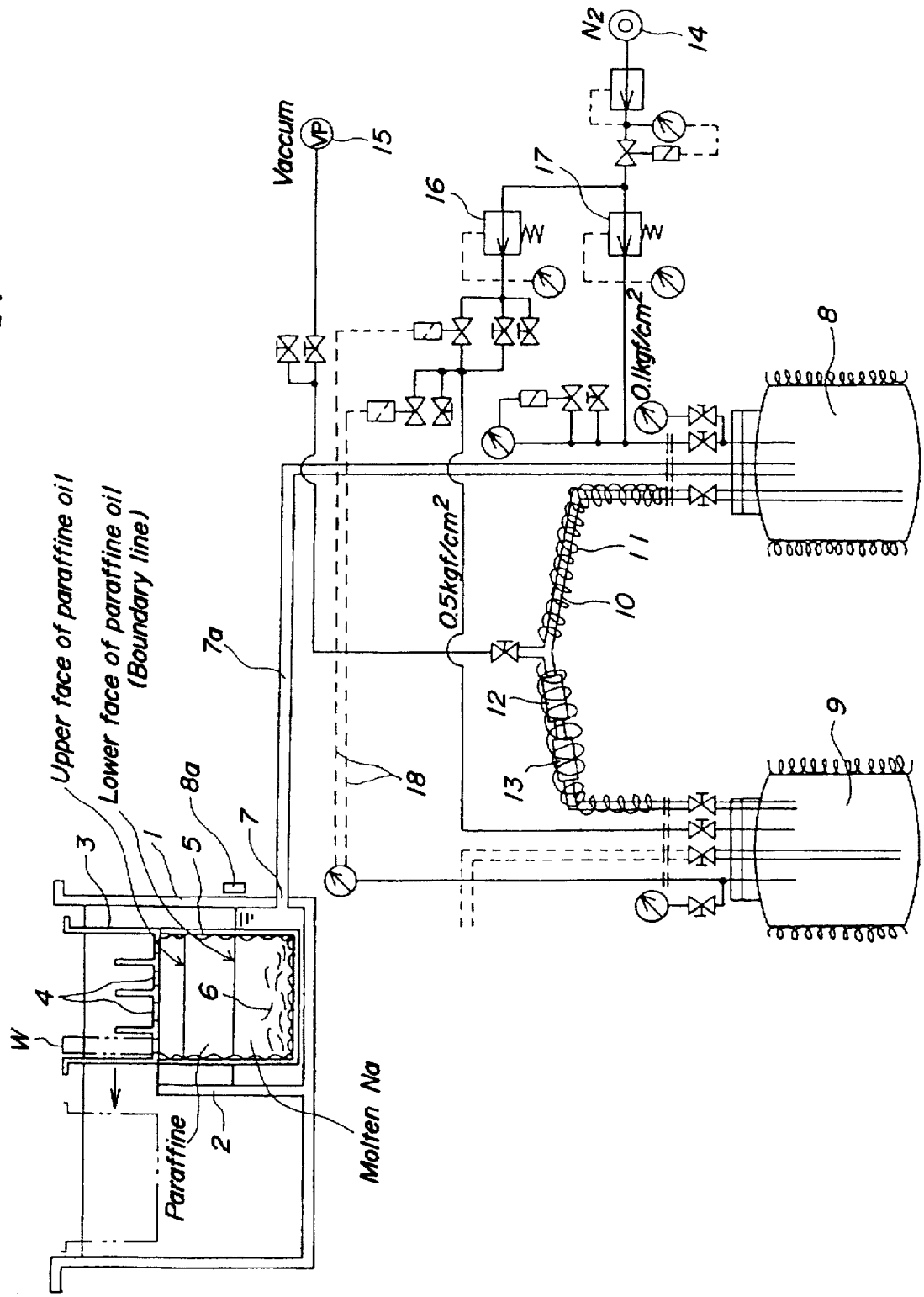
FIG. 1 is a pipe-line schematic view of a first embodiment of the present invention.

In FIG. 1, molten paraffine oil is charged in a heating oil vessel 1, which is internally divided by a partition 2. A workpiece-setting vessel 3 is set under a surface of the molten paraffine oil, and a number of spent NaS cells W each having an opening preliminarily formed are arranged in the workpiece-setting vessel in an inversed posture. When the spent NaS cells W are kept in an immersed state inside the heating oil vessel 1 for a given time period, Na inside the cells is melted, and flows down through through-holes 4 of the workpiece-setting vessel 3 at its bottom.

A filter 5 is placed inside the heating oil vessel 1. This filter 5 is a cage-shaped metallic filter having, for example, a mesh of 450 to 600 μm, and receives molten Na flowing down from the spent NaS cells W. Most part of powder 6 of a metal, such as aluminum or stainless steel, produced in cutting the openings in the NaS cells cannot pass the filter 5, and collected in it as shown in FIG. 1. Only the molten Na passes the filter 5, and collects in a bottom portion of the heating oil vessel 1. The entire filter 5 in FIG. 1 is a cage-shaped body made of the metallic filter, but it is not limited to one shown. For example, the filter may be a metallic filter constituting a part of a vessel.

A molten Na take-out opening 7 is provided in a wall of the heating oil vessel 1 at a location slightly higher than the bottom face of the heating oil vessel 1 but lower than an interface between the oil and the molten Na (a lower face of the paraffine oil). The molten Na collecting in the bottom portion of the heating oil vessel 1 is taken out through this take-out opening 7, and led into a falling tank 8 located under the surface of the molten Na through a warmed pipe 7a. The reason why the take-out opening 7 is provided at the location slightly higher than the bottom face of the heating oil vessel 1 is that fine metallic powder having passed the filter 5 is not sucked out through the opening 7. Since the metallic powder has a specific gravity far greater than that of the molten Na, the powder precipitates at the bottom face of the heating oil vessel 1. The take-out opening 7 is preferably higher than a bottom face of the filter 5.

As mentioned above, according to the present invention, the molten Na is collected in the bottom portion of the heating oil vessel 1 by utilizing a difference in specific gravity between the molten Na and the oil, and then is taken out from an outer side of the filter 5. Therefore, a boundary interface between the molten Na and the oil needs be observed. For this purpose, a sensor 8a is provided, and for example a ultrasonic wave sensor or the like may be used. The level of the surface of the molten Na is always detected by this sensor 8a, and the surface level of the molten Na is always kept higher than the molten Na take-out opening 7. The fundamental construction of the present invention has been explained above. In FIG. 1 are shown other specific structural features.

The molten Na collected inside the falling tank 8 is taken out to a container 9 through a warmed pipe 10. Around the falling tank 8, the container 9 and the warmed pipe 10 are wound heaters 11 for preventing the solidification of the molten Na. Midway the warmed pipe 10 are provided in-line filters 12 and 13. The in-line filter 12 is constituted by a wire mesh having a mesh of 140 µm, and $Na_2O$ produced through the oxidation of Na is removed by this filter 12. The in-line filter 13 is a sintered metal filter having pore diameters of 2 to 60 µm, and removes fine Fe, Ni, Al, etc.

The molten Na is transferred to the container 9 through the falling tank 8, so that the metallic powder not separated by the filter 5 can be separated by precipitating it in the bottom portion of the falling tank 8. Further, the molten Na can be taken out into the container 9 after being completely cleaned with the in-line filters 12 and 13. The metallic powder collecting inside the filter 5 is periodically taken outside.

As shown, an $N_2$ feed source 14 and a vacuum source 15 are connected to the above-mentioned molten Na transfer passage. The vacuum source 15 is to suck air inside the warmed pipe 10 before the warmed pipe 10 is used, so that oxidation of Na may be prevented. The $N_2$ feed source 14 is to fill the interior of the transfer passage with $N_2$, so that air may be prevented from entering the transfer passage. The $N_2$ fed from the $N_2$ feed source 14 is adjusted to, for example a pressure of 0.1 $kgf/cm^2$ through a pressure-reducing valve 16 and a pressure of 0.5 $kgf/cm^2$ through a pressure-reducing valve 17 so that the pressure of 0.1 $kgf/cm^2$ may be applied to the container 9, whereas the pressure of 0.5 $kgf/cm^2$ to the falling tank. By utilizing this pressure difference, the molten Na can be transferred from the falling tank 8 to the container 9. A reference numeral 18 is a control system for these internal pressures. Since the molten Na thus collected in the container 9 contains no metallic powder, the molten Na can be used again as a negative pole-activating material in a new NaS cell-producing line.

Figure 2:
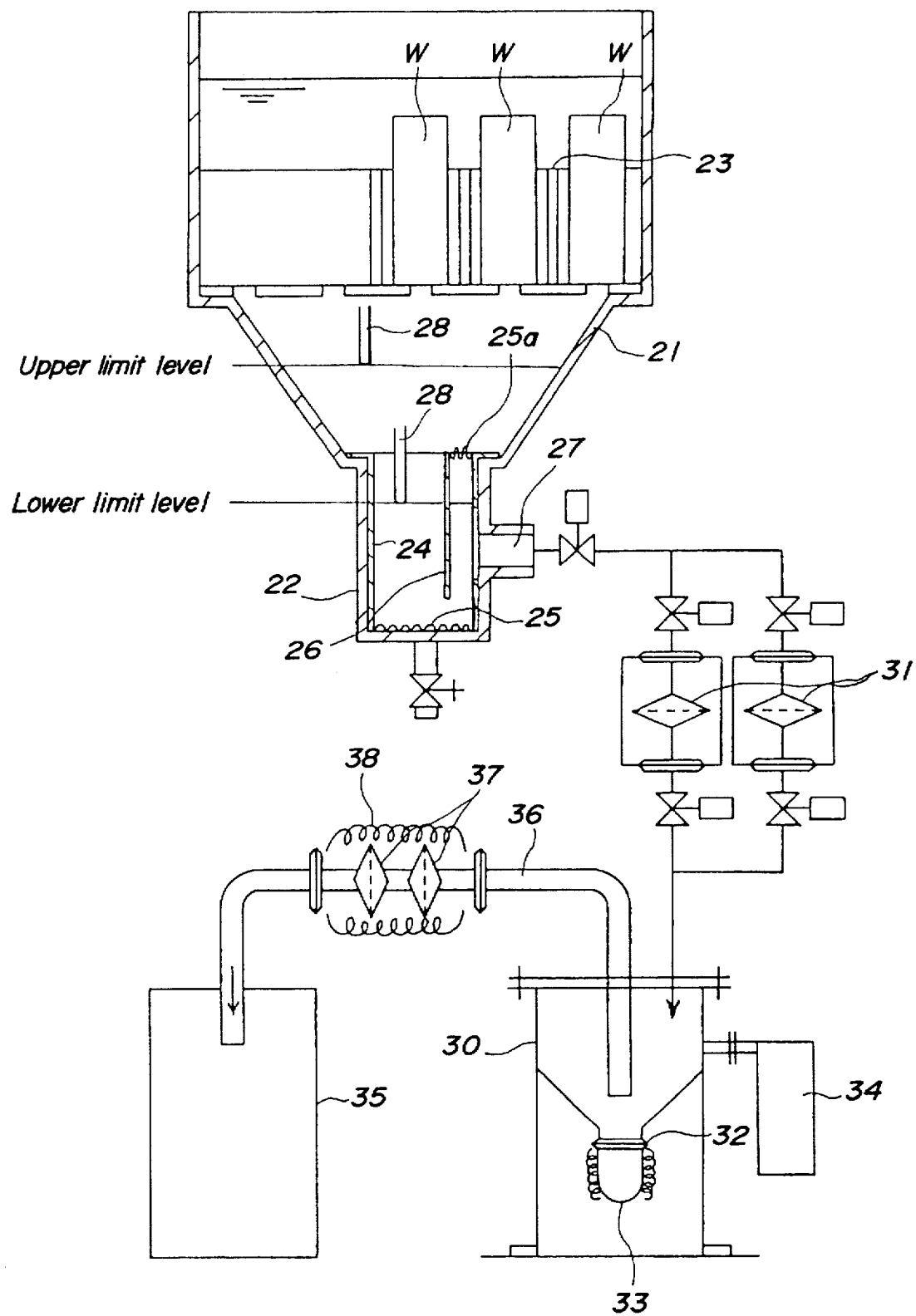
FIG. 2 is a pipe-line schematic view of a second embodiment of the present invention.

The second embodiment according to the present invention is shown in FIGS. 2 to 4.

In the embodiment, a heating oil vessel 21 includes a lower vessel portion 22, and a lattice-fashioned partitioned jig 23 is fitted to a stepped portion in an upper portion of the heating oil vessel 21. Inside the partitioned jig 23 are received in a reversed posture a number of spent NaS cells W having openings preliminarily formed. In this way, the sectional area of the heating oil vessel 21 is reduced by throttling the lower vessel portion 22 thereof, so that the height of a layer of the molten Na flown down can be increased.

Inside the lower vessel portion 22 is set a filter cage 24. The filter cage 24 includes a net-shaped filter 25 at a bottom, and a portion of the filter cage 24 is partitioned by a partition 26 hanging down from an upper side, and another net-shaped filter 25a is stretched at an upper side of the partitioned portion of the filter cage 24. The partition 26 functions to speedily flow down the metallic powder falling in the oil toward the bottom of the heating oil vessel so that the molten Na can be continuously taken out by an ordinary level control without being influenced by the floating metallic powder.

As shown in FIG. 4, a take-out opening 29 is provided in a side wall of the filter cage 24 at a location slightly higher than a bottom face of the filter cage 24. Therefore, the flow-out of the precipitated metallic powder can be prevented due to a volume shaded in FIG. 4. Also, a take-out port 27 is provided in a side wall of the lower vessel portion 22. The molten Na inside the lower vessel portion 22 is taken out through the take-out port 27. The height level of the molten Na layer inside the heating oil vessel 21 is controlled to an intermediate location between an upper limit level and a lower limit level shown in FIG. 2 by means of level rods 28. Even if the height level of the molten Na lowers down to the lower limit level, room still exists between the lower limit level and an upper end of the take-out port 27. Owing to this, the oil existing above the molten Na layer will not enter the take-out port 27.

Into a falling tank 30 is flown the molten Na through the take-out port 27 of the lower vessel portion 22 and a line filters 31. A wire mesh having a mesh of 200 µm is used as each line filter 31. The use of the two line filters 31 enables the line filters to be exchanged with one touch one by one even during operation. The line filters 31 may be automatically switched by automatically detecting the clogged state thereof.

As shown in FIG. 2, a bottom portion of the falling tank 30 is designed in a funnel shape, and a metallic powder-recovering vessel 33 is set at the bottom of the falling tank 30 with a one-touch coupling 32. Thus, even if the metallic powder flows down in the falling tank 30 due to any trouble, the powder can be recovered through being precipitated in the metallic powder-recovering vessel 33. An oil-recovering container 34 is fitted to a side portion of the falling tank 30 detachably with one-touch. Even if the oil flows down in the falling tank 30 due to any trouble, it may be taken outside.

Into a container 35 is taken out the molten Na from the falling tank 30 through a pipe 36. Midway the pipe 36, are provided unit type filters 37 and a heater 38 through which the molten Na is filtered and taken out to the container 35 without being solidified. A wire mesh or a sintered metal may be used as each filter 37, which may be also exchanged with one-touch operation.

The Na-recovering apparatus as the second embodiment constructed above can be continuously operated by the ordinary level control without being influenced by the floating metallic powder on the surface of the oil, and the metallic powder mixed into the oil can be effectively removed by filtration with the filters.

Figure 5:
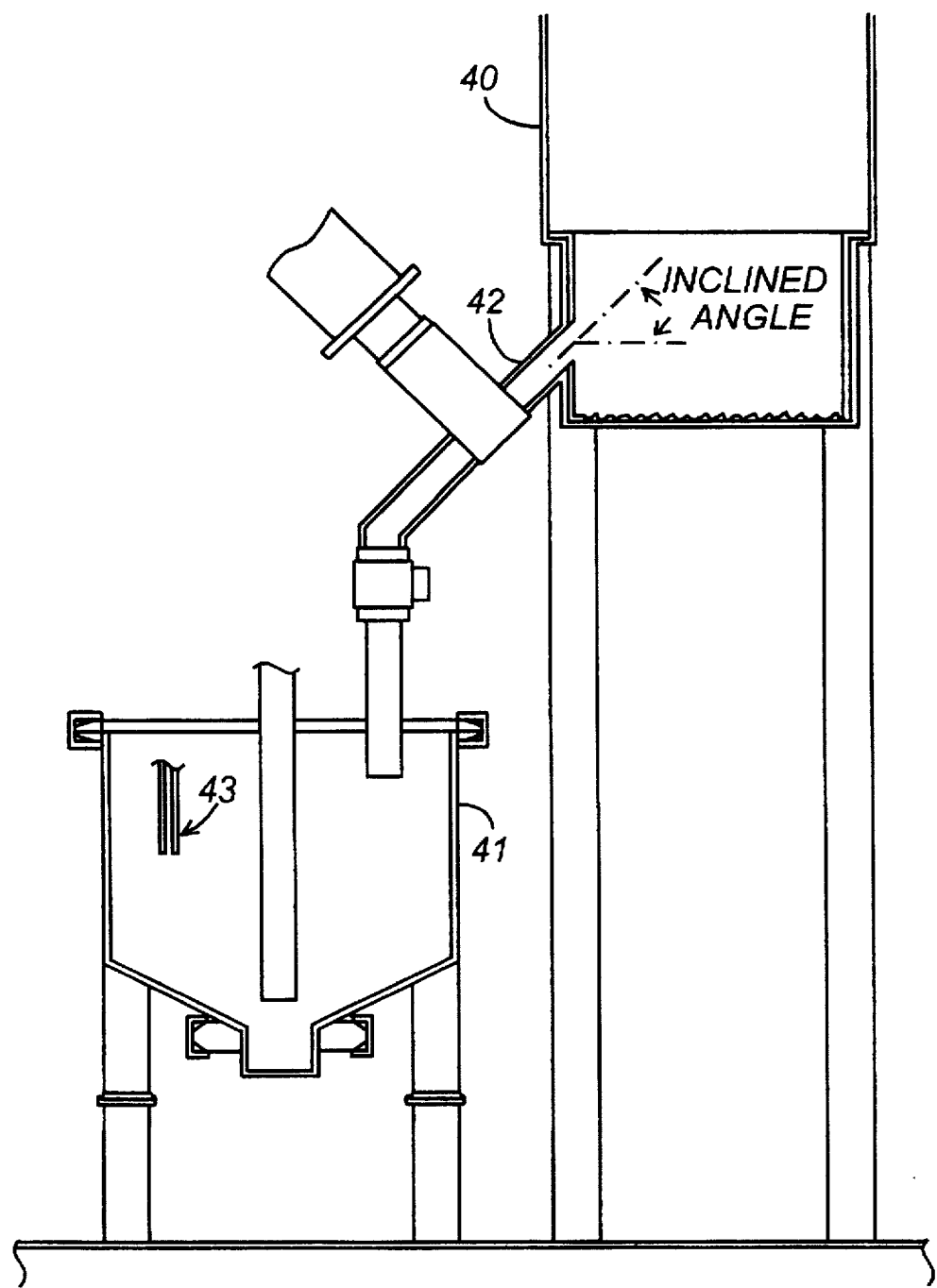
FIG. 5 is a sectional view for illustrating a heating oil vessel and a falling tank of a third embodiment according to the present invention.
Figure 6:
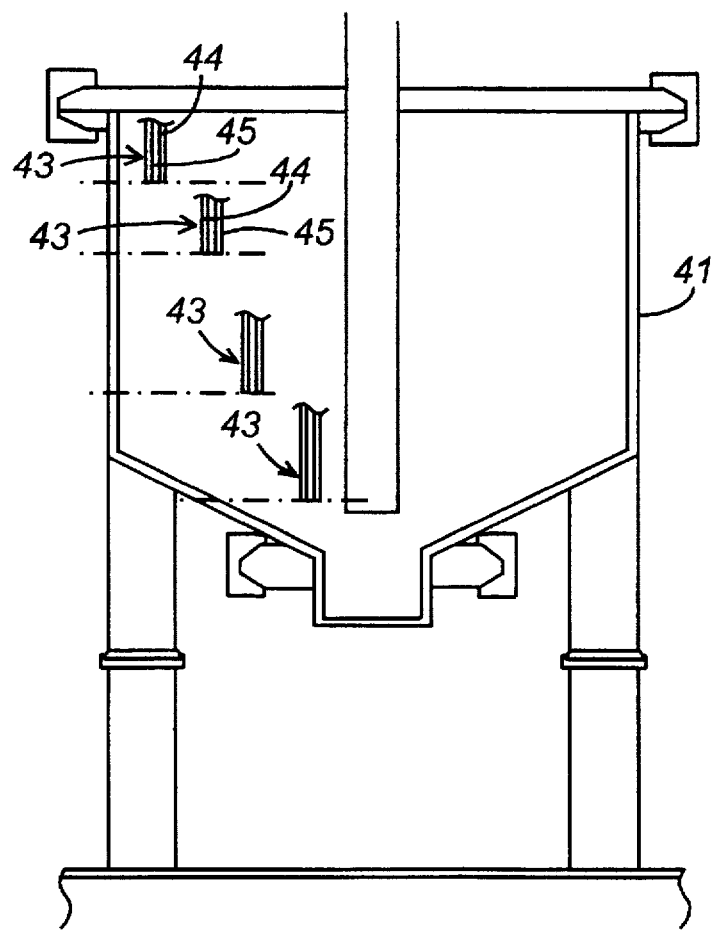
FIG. 6 is a sectional view for illustrating the falling tank of the third embodiment of the present invention.

The third embodiment is shown in FIGS. 5 and 6.

In this embodiment, as shown in FIG. 5, a molten Na take-out opening or port 42 through which molten Na flows down from a heating oil vessel 40 to a falling tank 41 is obliquely downwardly extended in a side wall of the heating oil vessel 40 as the opening 42 goes outwardly. By so doing, the molten Na can be smoothly flown down while preventing oil from mixing into the molten Na. Although a preferable inclination angle of the take-out opening 42 may differ depending upon the diameter of a pipe serving as the take-out opening 42, the inclination angle is preferably not less than 30°, more preferably 45° when the pipe having an inner diameter of the pipe being 20 mm is used.

As shown in FIG. 6, composite sensors 43 are provided at various heights inside a falling tank 41 in this embodiment. Each of the composite sensors 43 is constituted by a rod-shaped molten Na surface level sensor 44 and a rod-shaped oil surface level sensor 45 combined in parallel. The molten Na surface level sensor 44 utilizes conductivity of the molten Na, and it is constituted by a conductive rod. If a lower end of the sensor 44 contacts the molten Na, current flows through the molten Na so that it may be judged whether the surface level of the molten Na comes to the location of the sensor or not.

Further, the oil surface level sensor 45 is of a capacitance type. This sensor 45 utilizes the phenomenon that the capacitance between an electrode of the sensor 45 and the molten Na surface level sensor 44 adjacent thereto changes owing to the presence and the absence of the oil (paraffine) so that it may judge whether the surface level of the oil comes to a location of the sensor 45. Therefore, since two kinds of the sensors are installed in the same level, these sensors simultaneously operate if no oil mixes into the molten Na, whereas if the oil mixes into the molten Na, the capacitance sensor preferentially operates to detect the mixing of the oil.

As mentioned above, when the composite sensors 43 are provided at various heights inside the falling the tank 41, the surface level of the molten Na and that of the oil can be accurately observed. As a result, if a large amount of the oil accidentally flows down from the heating oil vessel 40 into the falling tank 41 or if the surface level of the molten Na abnormally rises in the falling tank 41, alarm may be issued. The height levels of the composite sensors to be installed may be determined corresponding to plural checking points set depending upon necessity. Such composite sensors may be provided not only in the falling tank 41 but also in the heating oil vessel 40.

As mentioned above, according to the process and the apparatus for recovering Na from the spent NaS cells, Na into which no metallic powder is mixed can be easily recovered from the spent NaS cells. Therefore, the recovered Na can be advantageously used again in the production of new NaS cells as it is.

What is claimed is:

1. A process for recovering sodium without metallic powder from a spent NaS cell, said process comprising the steps of providing a spent NaS cell, forming an opening in said cell wherein metallic powder from said cell becomes mixed with sodium, placing the spent NaS cell with the opening directed downwardly in a vessel containing heating oil and provided with a filter having an outer side, said heating oil having a different specific gravity than the specific gravity of molten sodium, maintaining said heating oil vessel at a temperature having at least at the melting point of sodium, permitting molten sodium containing metallic powder to flow down from the interior of the NaS cell through said downward directed opening and into said heating oil vessel, passing the molten sodium containing metallic powder through said filter to remove metallic powder from the molten sodium, collecting molten sodium without metallic powder in a bottom portion of said heating oil vessel by reason of the difference in the specific gravity of said molten sodium and said heating oil, and removing molten sodium without metallic powder from said outer side of said filter.

2. The process of claim 1, further comprising using a sensor to detect the surface level of molten sodium and maintaining said level as a result of the detection above the location at which the molten sodium is removed from the outer side of the filter and transferring said molten sodium to a falling tank placed below said molten sodium surface level in said vessel.

3. The process of claim 2, where transferring is carried out by vacuum suction.

4. The process of claim 2, where transferring is carried out by maintaining a pressure head between the surface level of the molten sodium in the heating oil vessel and the surface level of the molten sodium in the falling tank.

5. The process of claim 2, further comprising observing the level of an interface between the molten sodium and heating oil in said falling tank.

6. The process of claim 5, wherein observing is carried out using a composite sensor including (1) a rod-shaped molten sodium surface level sensor activated by the conductivity of the molten sodium and (2) a rod-shaped oil surface level sensor activated by the capacitance between a sensor electrode and the molten sodium surface level.

7. An apparatus for recovering molten sodium from a spent NaS cell having sodium containing metallic powder, said apparatus comprising a vessel for containing heating oil into which a spent NaS cell having an opening downwardly directed may be set, and a filter for separating molten sodium from metallic powder located inside said vessel, said vessel also having a take-out opening for removing molten sodium located at a portion of said vessel below the level of molten sodium when said apparatus is in use.

8. The apparatus of claim 7, wherein said take-out opening comprises a downwardly directed conduit angled outwardly from said vessel.

9. The apparatus of claim 7, further comprising a falling tank located below the surface level of molten sodium of said vessel when said vessel is in use.

10. The apparatus of claim 8, further comprising a falling tank located below the surface level of molten sodium of said vessel when said vessel is in use.

11. The apparatus of claim 9, further comprising a composite sensor located in said falling tank and including (1) a rod-shaped oil surface level sensor activated by the conductivity of molten sodium and (2) a rod-shaped oil surface level sensor activated by the capacitance between a sensor electrode and the molten sodium surface level, said composite sensor adapted to observe the surface level of heating oil in said falling tank.

12. The apparatus of claim 10, further comprising
a composite sensor located in said falling tank and including (1) a rod-shaped oil surface level sensor activated by the conductivity of molten sodium and (2) a rod-shaped oil surface level sensor activated by the capacitance between a sensor electrode and the molten sodium surface level, said composite sensor adapted to observe the surface level of heating oil in said falling tank.

* * * * *